United States Patent
Rahman et al.

(10) Patent No.: US 10,073,518 B2
(45) Date of Patent: Sep. 11, 2018

(54) AUTOMATIC CALIBRATION OF EYE TRACKING FOR OPTICAL SEE-THROUGH HEAD MOUNTED DISPLAY

(71) Applicant: QUALCOMM Incorporated, San Diego, CA (US)

(72) Inventors: Md Sazzadur Rahman, San Diego, CA (US); Kexi Liu, San Diego, CA (US); Martin H. Renschler, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 14/162,727

(22) Filed: Jan. 23, 2014

(65) Prior Publication Data
US 2015/0049013 A1   Feb. 19, 2015

Related U.S. Application Data

(60) Provisional application No. 61/867,569, filed on Aug. 19, 2013.

(51) Int. Cl.
*G06F 3/01* (2006.01)
*G02B 27/01* (2006.01)
*G06T 19/00* (2011.01)

(52) U.S. Cl.
CPC .......... *G06F 3/013* (2013.01); *G02B 27/017* (2013.01); *G06T 19/006* (2013.01);
(Continued)

(58) Field of Classification Search
CPC ............ G06F 3/013; G02B 2027/0105; G02B 2027/0107; G02B 2027/0109;
(Continued)

(56) References Cited

U.S. PATENT DOCUMENTS 4,710,758 A * 12/1987 Mussler ............... G06F 3/0418
340/571
5,471,226 A * 11/1995 Suzuki ................ G06F 3/0418
178/18.02
(Continued)

FOREIGN PATENT DOCUMENTS

WO   2012082971 A1   6/2012

OTHER PUBLICATIONS

International Search Report and Written Opinion—PCT/US2014/051722—ISA/EPO—dated Dec. 1, 2014.

*Primary Examiner* — Grant Sitta
(74) *Attorney, Agent, or Firm* — Arent Fox, LLP and Qualcomm, Incorporated (57) ABSTRACT

An apparatus for calibrating an eye tracking system of a head mounted display displays a moving object in a scene visible through the head mounted display. The object is displayed progressively at a plurality of different points (P) at corresponding different times (T). While the object is at a first point of the plurality of different points in time, the apparatus determines whether an offset between the point P and an eye gaze point (E) satisfies a threshold. The eye-gaze point (E) corresponds to a point where a user is determined to be gazing by the eye tracking system. If the threshold is not satisfied, the apparatus performs a calibration of the eye tracking system when the object is at a second point of the plurality of different points in time. The apparatus then repeats the determining step when the object is at a third point of the plurality of different points in time.

25 Claims, 9 Drawing Sheets (52) U.S. Cl.
CPC ............... *G02B 2027/0138* (2013.01); *G02B 2027/0178* (2013.01); *G02B 2027/0187* (2013.01)

(58) Field of Classification Search
CPC ...... G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 27/017; G02B 2027/0138; G02B 2027/0187; G02B 2027/0178; G06T 19/006
USPC ........................................ 345/156–173, 8, 7
See application file for complete search history.

(56) References Cited

U.S. PATENT DOCUMENTS

| | | | | |
|---|---|---|---|---|
| 5,689,619 | A * | 11/1997 | Smyth | G02B 27/0093 345/156 |
| 5,751,276 | A * | 5/1998 | Shih | G06F 3/0418 345/178 |
| 6,152,563 | A * | 11/2000 | Hutchinson | A61B 3/113 351/209 |
| 6,346,929 | B1 * | 2/2002 | Fukushima | G06F 3/013 345/156 |
| 6,456,952 | B1 * | 9/2002 | Nathan | G06F 3/0418 178/18.01 |
| 6,577,329 | B1 * | 6/2003 | Flickner | G06F 3/013 715/774 |
| 6,637,883 | B1 * | 10/2003 | Tengshe et al. | 351/210 |
| 7,130,447 | B2 * | 10/2006 | Aughey | A61B 3/113 382/103 |
| 7,306,337 | B2 * | 12/2007 | Ji | G06F 3/013 351/209 |
| 7,561,143 | B1 * | 7/2009 | Milekic | G06F 3/013 345/156 |
| 7,809,160 | B2 * | 10/2010 | Vertegaal | A61B 3/113 345/157 |
| 8,235,529 | B1 | 8/2012 | Raffle et al. | |
| 8,593,375 | B2 * | 11/2013 | Maltz | G06F 3/013 345/8 |
| 8,693,765 | B2 * | 4/2014 | Mercier | G06K 9/527 382/155 |
| 8,860,660 | B2 * | 10/2014 | Jahnke | G06F 3/013 345/156 |
| 8,885,877 | B2 * | 11/2014 | Publicover | G06K 9/00604 382/103 |
| 8,929,589 | B2 * | 1/2015 | Publicover et al. | 382/103 |
| 8,957,943 | B2 * | 2/2015 | Nourbakhsh | H04N 7/144 348/14.12 |
| 8,982,046 | B2 * | 3/2015 | Edwards | A61B 3/113 345/156 |
| 8,986,218 | B2 * | 3/2015 | De Lemos et al. | 600/558 |
| 9,122,346 | B2 * | 9/2015 | Wu | G06F 3/0418 |
| 2002/0105482 | A1 * | 8/2002 | Lemelson et al. | 345/7 |
| 2003/0098954 | A1 * | 5/2003 | Amir | A61B 3/113 351/210 |
| 2003/0227470 | A1 * | 12/2003 | Genc | G06F 3/011 345/633 |
| 2004/0061687 | A1 * | 4/2004 | Kent | G06F 3/044 345/173 |
| 2004/0075645 | A1 * | 4/2004 | Taylor | G06F 3/013 345/157 |
| 2005/0175218 | A1 * | 8/2005 | Vertegaal | A61B 3/113 382/103 |
| 2005/0225723 | A1 * | 10/2005 | Pilu | 351/209 |
| 2009/0086165 | A1 * | 4/2009 | Beymer | G06K 9/00604 351/210 |
| 2010/0053555 | A1 * | 3/2010 | Enriquez | A61B 3/113 351/210 |
| 2010/0295924 | A1 * | 11/2010 | Miyatani | H04N 13/344 348/46 |
| 2010/0328444 | A1 * | 12/2010 | Blixt | A61B 3/113 348/78 |
| 2011/0018862 | A1 * | 1/2011 | Epps | 345/419 |
| 2011/0141010 | A1 * | 6/2011 | Sakata | A61B 3/113 345/156 |
| 2011/0170065 | A1 * | 7/2011 | Sugio | A61B 5/0496 351/209 |
| 2011/0182472 | A1 * | 7/2011 | Hansen | A61B 3/113 382/103 |
| 2011/0182501 | A1 * | 7/2011 | Mercier | G06K 9/527 382/159 |
| 2011/0254865 | A1 * | 10/2011 | Yee et al. | 345/661 |
| 2011/0291990 | A1 * | 12/2011 | Kiyose | G06F 3/0418 345/175 |
| 2011/0310006 | A1 * | 12/2011 | Edwards et al. | 345/156 |
| 2012/0075586 | A1 * | 3/2012 | Kirschen | A61B 3/028 351/239 |
| 2012/0105486 | A1 * | 5/2012 | Lankford | G06F 3/013 345/661 |
| 2013/0077049 | A1 * | 3/2013 | Bohn | G02B 5/20 351/210 |
| 2013/0145304 | A1 * | 6/2013 | DeLuca | G06F 3/013 715/781 |
| 2013/0154918 | A1 * | 6/2013 | Vaught | G06K 9/00617 345/156 |
| 2013/0187835 | A1 * | 7/2013 | Vaught | G06K 9/00604 345/8 |
| 2013/0249864 | A1 * | 9/2013 | Wu | G06F 3/0418 345/175 |
| 2013/0321265 | A1 * | 12/2013 | Bychkov | G06F 3/013 345/156 |
| 2014/0055747 | A1 * | 2/2014 | Nistico | A61B 3/14 351/206 |
| 2014/0085198 | A1 * | 3/2014 | Jahnke | G06F 3/013 345/157 |
| 2014/0226131 | A1 * | 8/2014 | Lopez | G06F 1/1626 351/210 |
| 2014/0282646 | A1 * | 9/2014 | McCoy | G06K 9/00597 725/12 |
| 2014/0333665 | A1 * | 11/2014 | Sylvan | G02B 27/0149 345/633 |
| 2014/0361996 | A1 * | 12/2014 | Eden | G06F 3/013 345/173 |
| 2015/0002394 | A1 * | 1/2015 | Cho | G02B 27/0093 345/156 |
| 2015/0084864 | A1 * | 3/2015 | Geiss | G06F 3/013 345/158 |
| 2016/0109945 | A1 * | 4/2016 | Kempinski | G06F 3/013 348/78 |

* cited by examiner

AUTOMATIC CALIBRATION OF EYE TRACKING FOR OPTICAL SEE-THROUGH HEAD MOUNTED DISPLAY

CROSS-REFERENCE TO RELATED APPLICATION(S)

This application claims the benefit of U.S. Provisional Application Ser. No. 61/867,569, entitled "Eye Tracking Auto Calibration for Optical See-Through HMD With Augmented Reality and Eye Tracking" and filed on Aug. 19, 2013, which is expressly incorporated by reference herein in its entirety.

BACKGROUND

Field

The present disclosure relates generally to augmented reality (AR) devices, e.g., AR eyeglasses, having optical see-through head mounted displays (HMD) and eye tracking capability, and more particularly, to automatic calibration of the eye tracking capabilities of such AR devices. AR is a technology in which a user's view of the real world is enhanced with additional information generated from a computer model. The enhancements may include labels, 3D rendered models, or shading and illumination changes. AR allows a user to work with and examine the physical real world, while receiving additional information about the objects in it.

Background

AR devices typically include an optical see-through HMD and one or more user input mechanisms that allow users to simultaneously see and interact with their surroundings while interacting with applications, such as e-mail and media players. User input mechanisms may include one or more of gesture recognition technology, eye tracking technology, and other similar mechanisms.

AR devices with eye tracking capability may provide for visual activation of applications and selection of files and documents, wherein activation or selection occurs when a user is looking at a displayed object corresponding to the application, file or document. In such AR devices, the displayed object, e.g., application icon, is displayed at a coordinate location of the HMD, while the location on the HMD at which a user is looking or gazing is determined using eye tracking technology. The determined eye gaze location is identified by coordinates of the HMD and may be displayed on the HMD as a point. When the eye gaze coordinates of the user are within range of the displayed object, i.e., either at or sufficiently near the coordinates of the displayed object, activation or selection of the displayed object occurs.

Effective implementation of visual activation of applications and selection of files and documents through eye tracking necessarily depends on the accuracy of the eye tracking technology. Eye tracking accuracy varies depending on environmental factors, such as light conditions, and user factors, such as eye shape and nose height. In cases where eye tracking is inaccurate, the eye gaze location or point determined by the eye tracking technology may not correspond to the location where the user is looking. Accordingly, although a user may be looking at an application icon on the HMD in an attempt to launch the application, the AR device does not recognize the attempt because the eye gaze coordinate output by the eye tracking technology is not within range of the icon.

An AR device may present a point on the HMD corresponding to the eye gaze coordinate. In such instances, the user may become aware of an inaccuracy of the eye tracking technology upon noting that the eye point does not appear where the user is looking, and as a result, initiate calibration of the eye tracking technology. AR devices, however, may not display every eye gaze coordinate in order to reduce power consumption and to minimize display real estate occupation and user distraction. As a result, a user may not be aware that the eye gaze point output by the eye tracking technology does not accurately reflect where the user is looking.

SUMMARY

In an aspect of the disclosure, a method, an apparatus, and a computer program product for calibrating an eye tracking system of a head mounted display are provided. An example apparatus displays a moving object in a scene visible through the head mounted display. The object is displayed progressively at a plurality of different points (P) at corresponding different times (T). While the object is at a first point of the plurality of different points in time, the apparatus determines whether an offset between the point P and an eye gaze point (E) satisfies a threshold. The eye-gaze point (E) corresponds to a point where a user is determined to be gazing by the eye tracking system. If the threshold is not satisfied, the apparatus performs a calibration of the eye tracking system when the object is at a second point of the plurality of different points in time. The apparatus then repeats the determining step when the object is at a third point of the plurality of different points in time.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects related to automatic calibration of the eye tracking capabilities of AR devices will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

Figure 1:
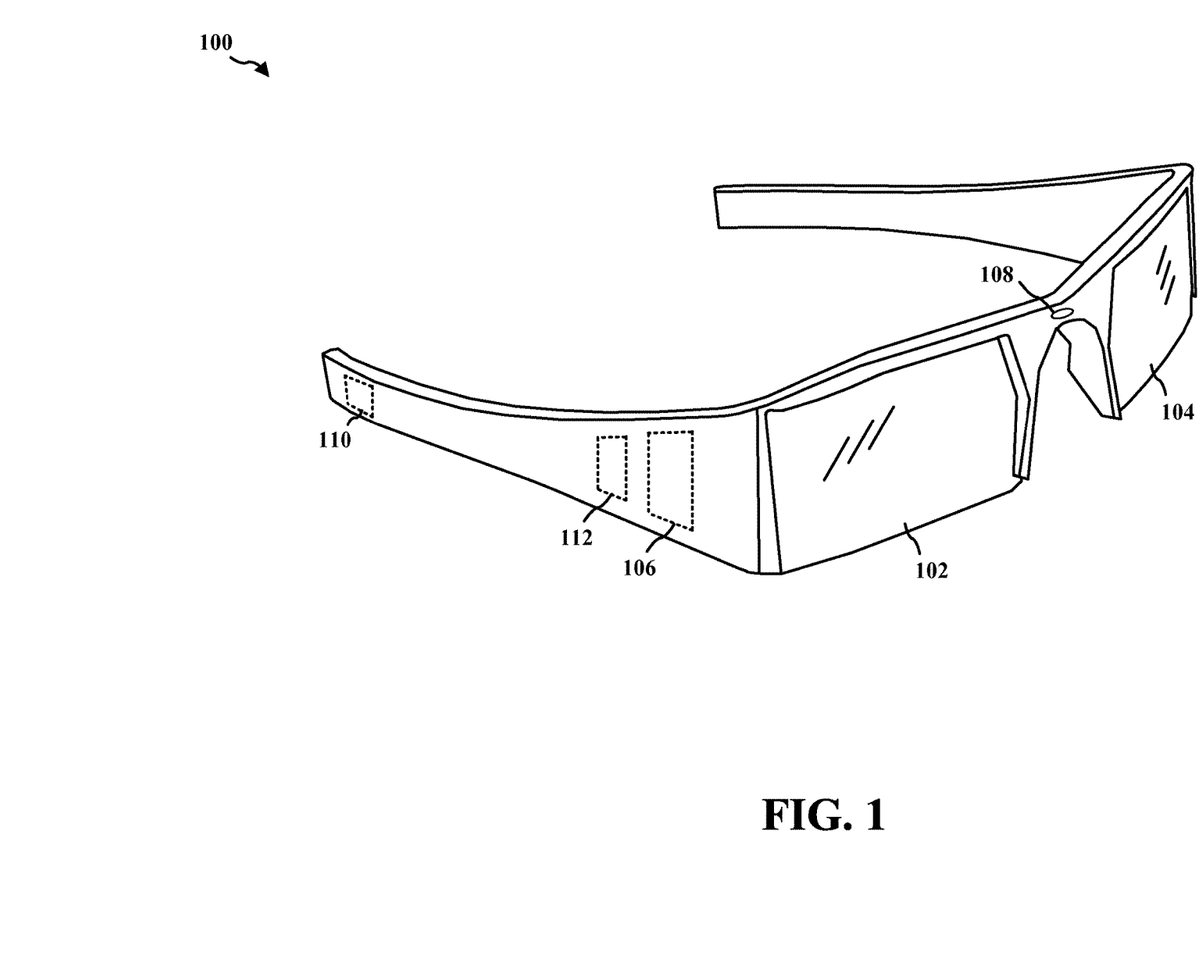
FIG. 1 is an illustration of an AR device in the form of a pair of eyeglasses.

FIG. 1 is an illustration of an example AR device 100 in the form of a pair of eyeglasses. The AR device 100 is configured such that the user of the device is able to view real-world scenes through optical see-through HMDs together with content displayed on the HMDs, including both two-dimensional (2D) and three-dimensional (3D) AR content. The AR device 100 may also be configured to allow the user to interact with the content and possibly with remote devices, systems or networks through wireless communication. The AR device may also provide feedback to the user as a result of such interactions, including for example, audio, video or tactile feedback. To these ends, the example AR device 100 includes a pair of optical see-through HMDs 102, 104, an on-board processing system 106, one or more sensors, such as a scene camera 108, one or more eye tracking components (not visible) for each of the right eye and left eye, one or more user-interaction feedback devices 110 and a transceiver 112.

The processing system 106 and the eye tracking components provide eye tracking capability. Depending on the eye tracking technology being employed, eye tracking components may include one or both of eye cameras and infra-red emitters, e.g. diodes. The processing system 106 and the scene camera 108 provide gesture tracking capability.

The feedback devices 110 provide perception feedback to the user in response to certain interactions with the AR device. Feedback devices 110 may include a speaker or a vibration device. Perception feedback may also be provided by visual indication through the HMD.

The transceiver 112 facilitates wireless communication between the processing system 106 and remote devices, systems or networks. For example, the AR device may communicate with remote servers through the transceiver 112 for purposes of remote processing, such as on-line searches through remote search engines.

As mention above, the AR device 100 allows a user to view real-world scenes through optical see-through HMDs together with content displayed on the HMDs. For example, with reference to FIG. 2, as a user is viewing a real-world scene 200 through the optical see-through HMDs 102, 104, the scene camera 108 may capture an image of the scene and send the image to the on-board processing system 106. The processing system 106 may process the image and output AR content 202 for display on the HMDs 102, 104. The content 202 may provide information describing what the user is seeing. In some cases, the processing system 106 may transmit the image through the transceiver 112 to a remote processor (not shown) for processing. The processing system 106 may also display one or more application icons 204, 206, 208 on the HMDs 102, 104 and output application content, such as e-mails, documents, web pages, or media content such as video games, movies or electronic books, in response to user interaction with the icons.

Figure 2:
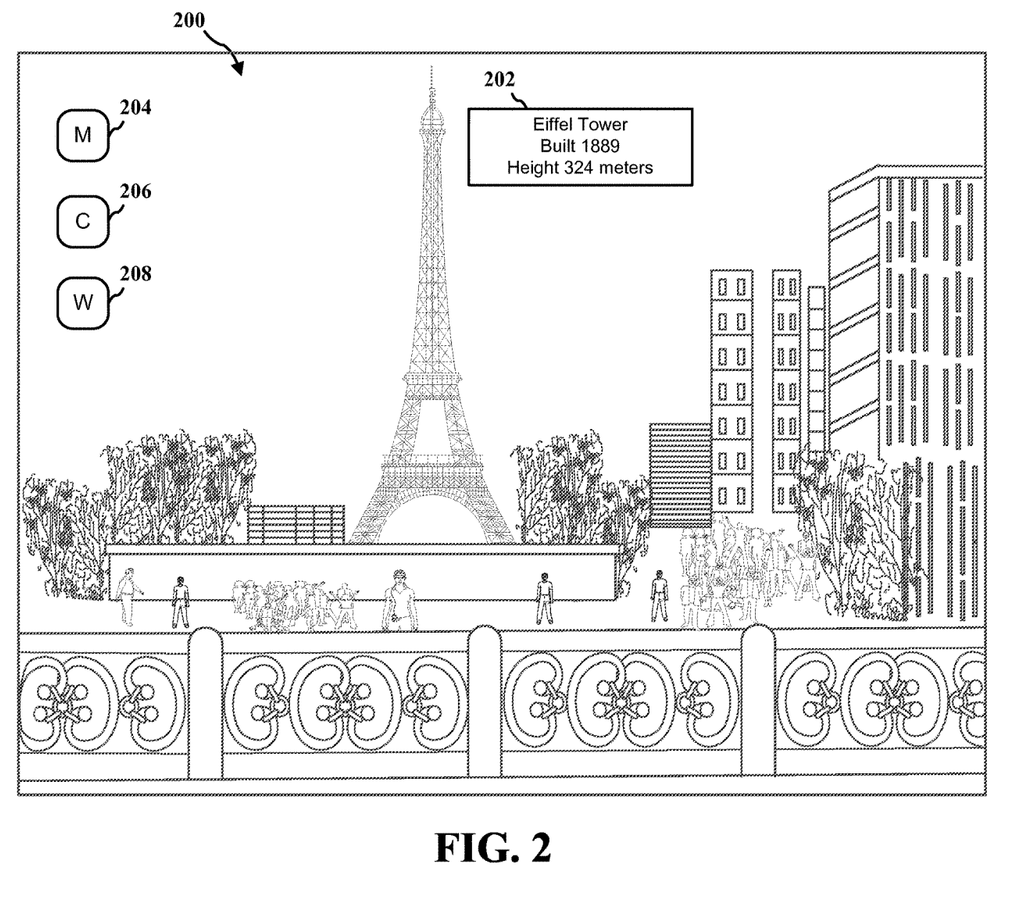
FIG. 2 is an illustration of a real-world scene through an optical see-through HMDs with augmented reality.

User interaction with the AR device 100 is provided by one or more user input mechanisms, such as a gesture tracking module or an eye-gaze tracking module. Gesture tracking is provided by the scene camera 108 in conjunction with a gesture tracking module of the processing system 106. With gesture tracking, a user may attempt to activate an application by placing his finger on an application icon 204, 206, 208 in the field of view of the AR device. The scene camera 108 captures an image of the finger and sends the image to the gesture tracking module. The gesture tracking module processes the image and determines coordinates of a gesture point corresponding to where the user is pointing. The processing system 106 compares the coordinate location of the gesture point to the coordinate location of the icon on the display. If the locations match, or are within a threshold distance of each other, the processing system 106 determines that the user has selected the icon 204, 206, 208 and accordingly, launches the application.

Eye-gaze tracking is provided by the eye tracking components (not visible) in conjunction with an eye tracking module of the processing system 106. A user may attempt to activate an application by gazing at an application icon 204, 206, 208 in the field of view of the AR device. The eye tracking components capture images of the eyes, and provide the images to the eye tracking module. The eye tracking module processes the images and determines coordinates of an eye-gaze point corresponding to where the user is looking. The processing system 106 compares the coordinate location of the eye-gaze point to the coordinate location of the icon on the display. If the locations match, or are within a threshold distance of each other, the processing system 106 determines that the user has selected the icon 204, 206, 208 and accordingly, launches the application. Often, such eye-gaze based launching is coupled with another form of input, e.g., gesture, to confirm the user's intention of launching the application.

Figure 3:
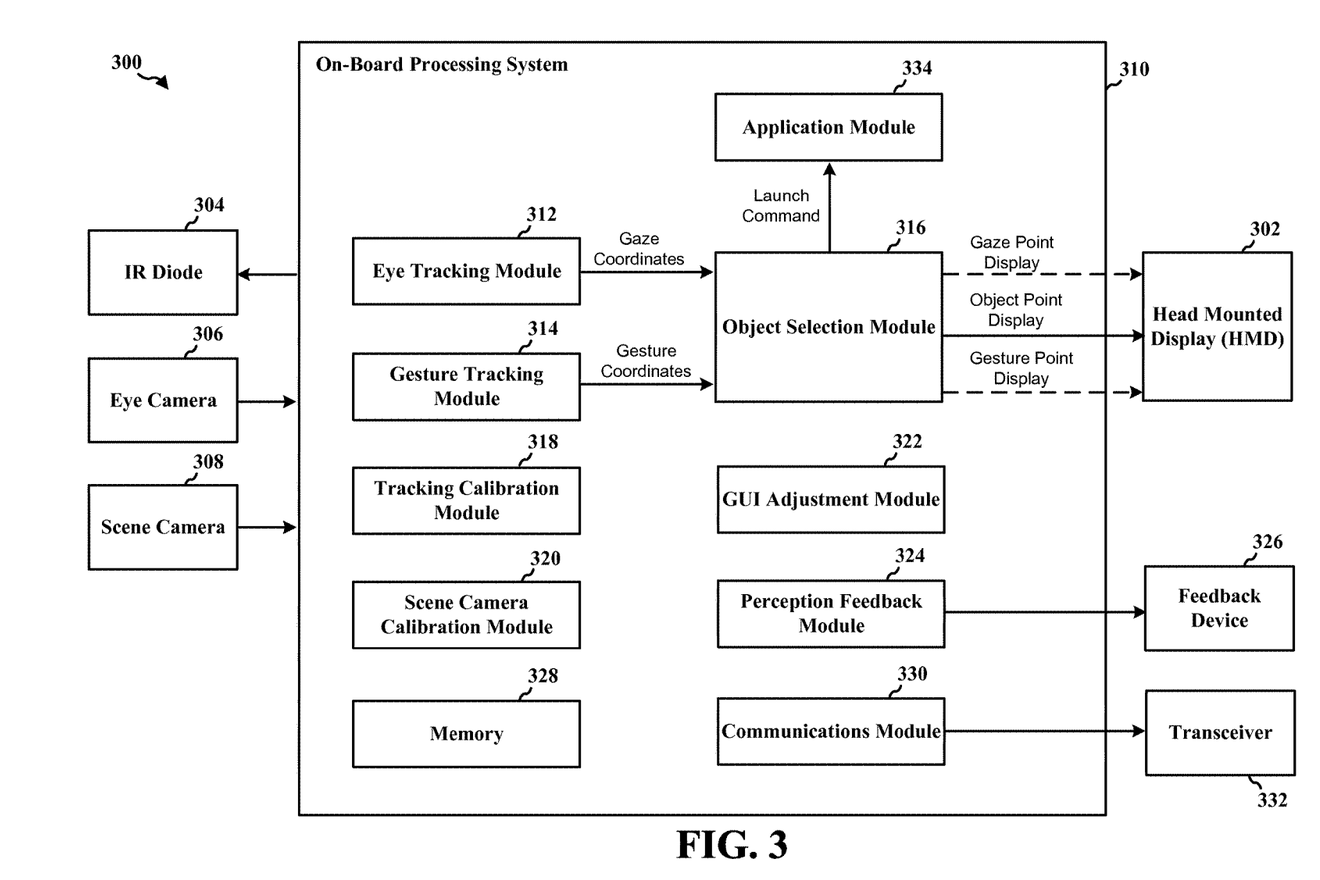
FIG. 3 is a diagram illustrating elements of an AR device.

FIG. 3 is a diagram illustrating elements of an example AR device 300 with optical see-through HMDs 302. The AR device 300 may include one or more sensing devices, such as infrared (IR) diodes 304 facing toward the wearer of the AR device and eye cameras 306 facing toward the wearer. A scene camera 308 facing away from the wearer captures images of the field of view seen by the user through the HMD 302. The cameras 306, 308 may be video cameras. While only one IR diode 304 and one eye camera 306 are illustrated, the AR device 300 typically includes several diodes and cameras for each of the left eye and right eye. A single scene camera 308 is usually sufficient. For ease of illustration only one of each sensor type is shown in FIG. 3.

The AR device 300 includes an on-board processing system 310, which in turn includes one or more of an eye tracking module 312 and a gesture tracking module 314. As described further below, an object selection module 316 processes the outputs of the one or more tracking modules to determine user interactions and tracking module accuracy. A tracking calibration module 318 calibrates the one or more tracking modules if the tracking module is determined to be inaccurate.

The on-board processing system 310 may also include a scene camera calibration module 320, a graphical user interface (GUI) adjustment module 322, and a perception feedback module 324. The scene camera calibration module 320 calibrates the AR device so that the AR content is aligned with real world objects. The GUI adjustment module 322 may adjust the parameters of GUI objects displayed on the HMD to compensate for eye-tracking or gesture-tracking inaccuracies detected by the object selection module 316. Such adjustments may precede, supplement, or substitute for the actions of the tracking calibration module 318. The feedback module 324 controls one or more feedback devices 326 to provide perception feedback to the user in response to one or more types of user interactions. For example, the feedback module a feedback device 326 to output sound when a user selects an icon in the field of view using a gesture or eye gaze.

The AR device 300 further includes memory 328 for storing program code to implement the foregoing features of the on-board processing system 310. A communications module 330 and transceiver 332 facilitate wireless communications with remote devices, systems and networks. For example, in one implementation, an image of a real-world object may be captured by the scene camera 308 and transmitted by the communications module 330 and the transceiver 332 to a remote search engine, with subsequent search results being received by the transceiver.

With further respect to eye tracking capability, the diodes 304 and eye cameras 306, together with the eye tracking module 312, provide eye tracking capability as generally described above. In the example implementation of FIG. 3, the eye tracking capability is based on known infrared technology. One such known technology uses infrared light emitting diodes and infrared sensitive video camera for remotely recording images of the eye. Infrared light output by the diode 304 enters the eye and is absorbed and re-emitted by the retina, thereby causing a "bright eye effect" that makes the pupil brighter than the rest of the eye. The infrared light also gives rise to an even brighter small glint that is formed on the surface of the cornea. The eye tracking module 312 acquires a video image of the eye from the eye camera 306, digitizes it into a matrix of pixels, and then analyzes the matrix to identify the location of the pupil's center relative to the glint's center, as well as a vector between these centers. Based on the determined vector, the eye tracking module 312 outputs eye gaze coordinates defining an eye gaze point (E).

The scene camera 308, together with the gesture tracking module 314, provide gesture tracking capability using a known technology as generally described above. In the example implementation of FIG. 3, the gesture tracking capability is based on gesture images captured by the scene camera 308. The gesture images are processed by the gesture tracking module 314 by comparing captured images to a catalog of images to determine if there is a match. For example, the user may be pointing at an icon in the field of view. The gesture tracking module 312 may detect a match between the gesture image and a cataloged image of pointing and thereby recognize the gesture as pointing. Upon detection of a recognized gesture, the gesture tracking module 314 processes the captured image further to determine the coordinates of a relevant part of the gesture image. In the case of finger pointing, the relevant part of the image may correspond to the tip of the finger. The gesture tracking module 314 outputs gesture coordinates defining a gesture point (G).

The object selection processor 316 functions to determine whether interactions of the user, as characterized by one or more of the eye tracking module 312 and the gesture tracking module 314, correspond to a selection of an object, e.g., application icon, displayed on the HMD 302 and visible in the field of view. If an interaction does correspond to a selection by the user, for example, a selection of an icon to launch an application 334, the object selection processor 316 outputs a command to the application.

With respect to object selection based on eye gaze, the object selection processor 316 receives eye gaze coordinates representing an eye gaze point (E) from the eye tracking module 312. In one configuration, the eye gaze coordinates output by the eye tracking module 312 are with respect to the origin and direction of an eye coordinate system. The eye coordinate system is defined by the eye tracking module 312 and usually has an origin corresponding to the center of the user's respective right or left eye. In this configuration, the object selection processor 316 transforms the eye gaze coordinates to a screen coordinate system, and optionally outputs the transformed eye gaze coordinates as an eye gaze point (E) for display on the HMD. The screen coordinate system is defined by the HMD and usually has an origin corresponding to the center of the respective right or left HMD. In another configuration, the transformation of the eye gaze coordinate to the screen coordinate system of the HMD may be performed by the eye tracking module 306.

The object selection processor 316 compares the eye gaze coordinates of eye gaze point (E) to the object coordinates of an object point (P), for example, by determining the distance between the point (E) and point (P). The object point (P) may correspond to the center of an application icon displayed on the HMD. If the eye gaze point (E) is determined to be at or near the object point (P), then the object selection processor 316 determines that a selection has occurred, and an appropriate action follows. For example, if the object point (P) represents and application icon, the command may open the application.

With respect to object selection based on gesture, the object selection processor 316 receives gesture coordinates representing a gesture point (G) from the gesture tracking module 314. In one configuration, the gesture coordinates output by the gesture tracking module 314 are with respect to the origin and direction of gesture coordinate system. The gesture coordinate system is defined by the gesture tracking module 314 and usually has an origin corresponding to the center of the scene camera 308. In this configuration, the object selection processor 316 transforms the gesture coordinates to a screen coordinate system, and optionally outputs the transformed gesture coordinates as gesture point (G) for display on the HMD. The screen coordinate system is defined by the HMD and usually has an origin corresponding to the center of the respective right or left HMD. In another configuration, the transformation of the gesture coordinate to the screen coordinate system of the HMD may be performed by the gesture tracking module 314.

The object selection processor 316 compares the gesture coordinates of gesture point (G) to the object coordinates of an object point (P), for example, by determining the distance between the point (G) and point (P). The object point (P) may correspond to the center of an application icon displayed on the HMD. If the gesture point (G) is determined to be at or near the object point (P), then the object selection processor 316 determines that a selection has occurred, and an appropriate action follows. For example, if the object point (P) represents and application icon, the command may open the application.

As mentioned above, the accuracy of eye tracking technology varies depending on environmental factors, such as light conditions, and user factors, such as eye shape and nose height. Inaccurate eye tracking may result in poor user experience in that a user's attempt to activate an application may go undetected by the processing system 106.

Figure 4:
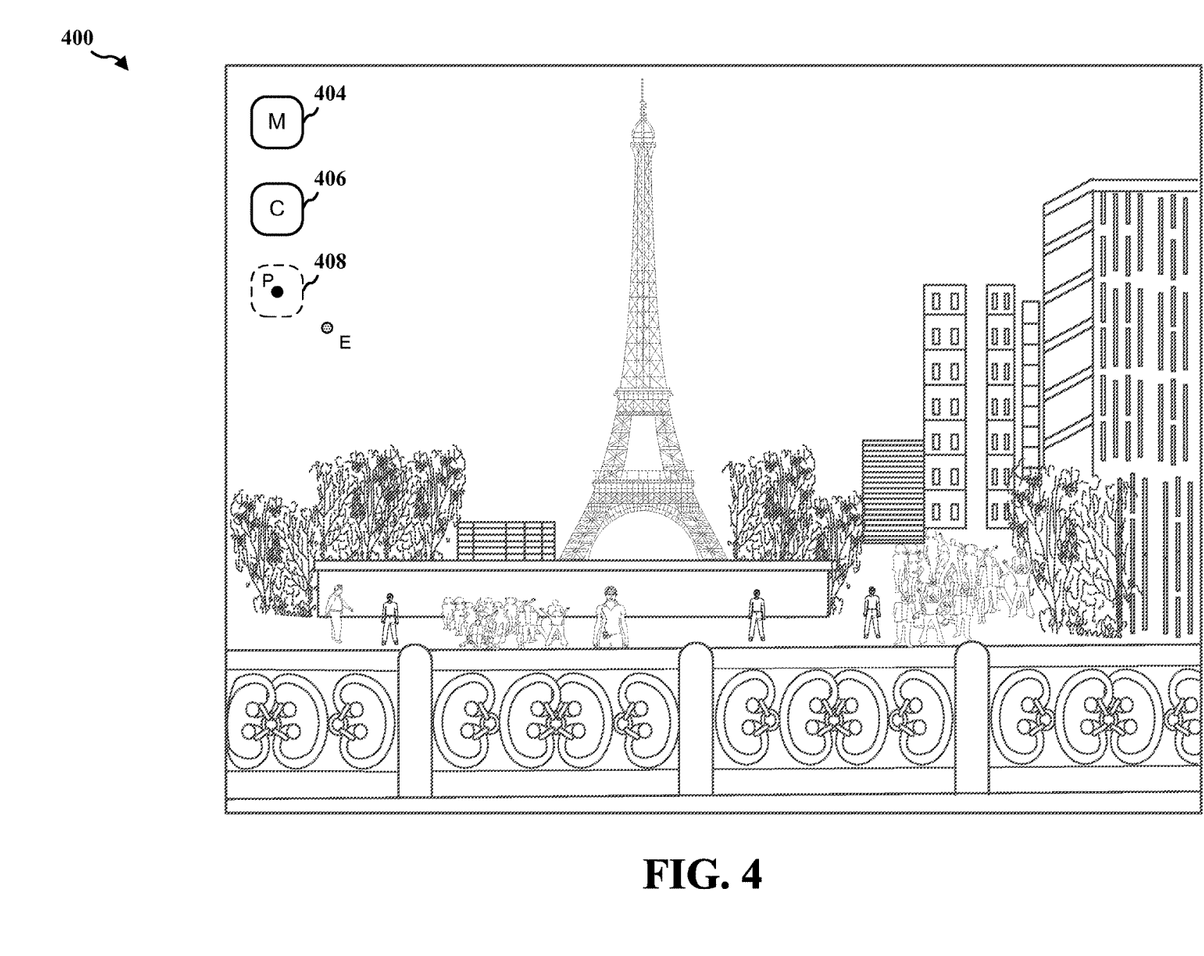
FIG. 4 is an illustration of an HMD scene with inaccurate eye tracking, wherein a reported eye-gaze coordinate is offset from a user's actual gaze.

FIG. 4 is an illustration of an instance of inaccurate eye tracking Here, the user is attempting to activate the application associated with an icon 408 by staring at the icon. The eye tracking module 310, however, outputs an eye-gaze point (E) having a location that does not match, nor fall within a threshold distance of, the object point (P) representing the icon 408. The eye tracking module 310 may require calibration so that the output of the eye tracking module allows the object selection processor 314 to accurately determine whether a user is selecting an object on the HMD screen.

Figure 5:
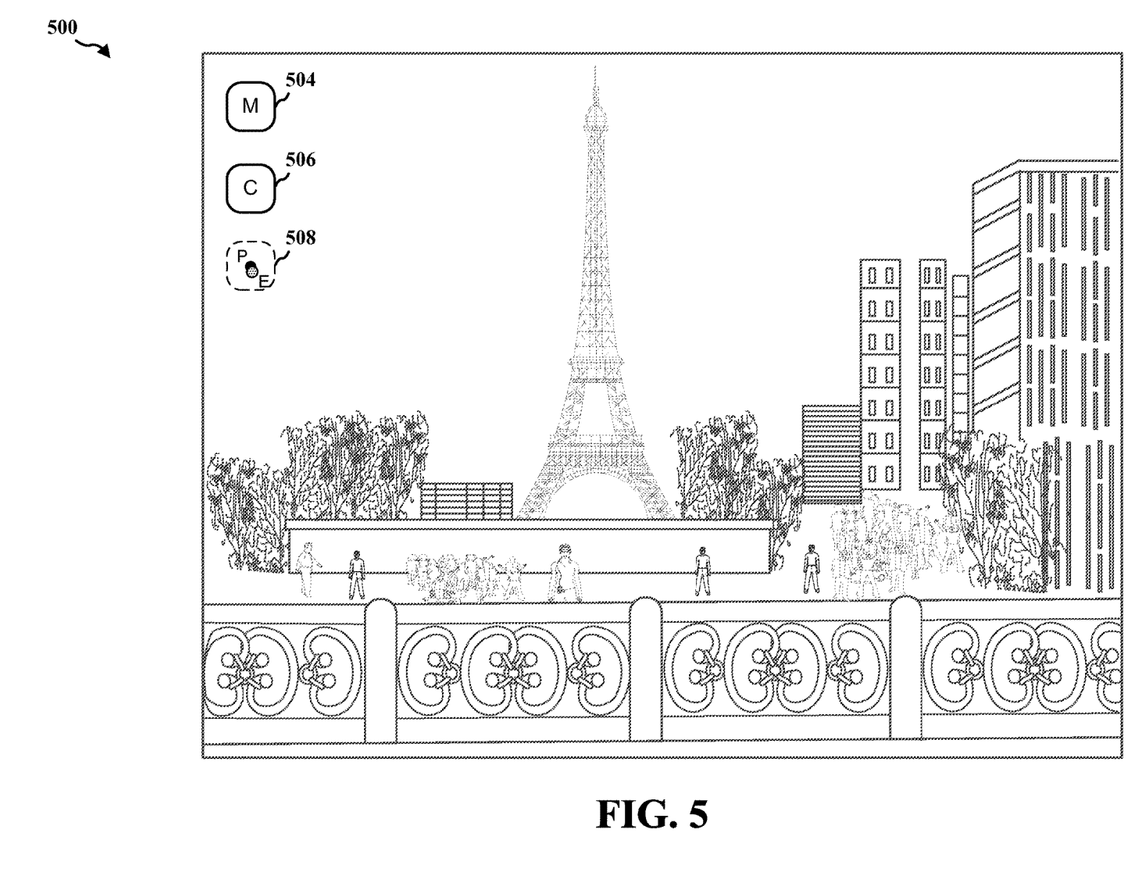
FIG. 5 is an illustration of an HMD scene with accurate eye tracking, wherein a reported eye-gaze coordinate is sufficiently aligned with a user's actual gaze.

FIG. 5 is an illustration of an instance of accurate eye tracking after calibration. During a typical calibration phase, a user is presented at least one virtual target dot (T) in the optical see-through HMD display. The user then stares into the dot (T) and initiates eye tracking calibration using some input technique, such as a gesture. The eye tracking module generates a user eye-gaze point (E) based on its model. Using coordinates of the target dot (T) and coordinates of the eye-gaze point (E), the eye tracking module adjusts its output model such that the target dot (T) and eye-gaze point (E) overlap, as shown in FIG. 5. After calibration, the AR device displays a dot corresponding to the calibrated eye-gaze point (E) along with the target dot (P) the user is looking at. This helps the user to visually determine the accuracy of the calibration process and to determine whether the accuracy acceptable. If the accuracy is not acceptable, the user may repeat the calibration process.

There are two problems with the foregoing calibration process: First, the calibration process is user initiated in that the user uses some input technique, such as a gesture detectable by the gesture recognition system or a touch detectable by a touch sensor to tell the system that she is looking into the target dot and ready for calibration. Second, completion of the calibration process is user dependent in that the user decides whether she is satisfied with the calibration accuracy or not. If the user is not satisfied, the calibration process need to be is repeated. On the other hand, if the user goes forward with poor eye tracking accuracy, the eye tracking based user input system may not work well, especially when eye tracking is used for triggering some events, thereby resulting in poor user experience. Disclosed herein is a technique which removes the above two problems and ensures good eye tracking accuracy before the user moves to next phase in the system.

Figure 6:
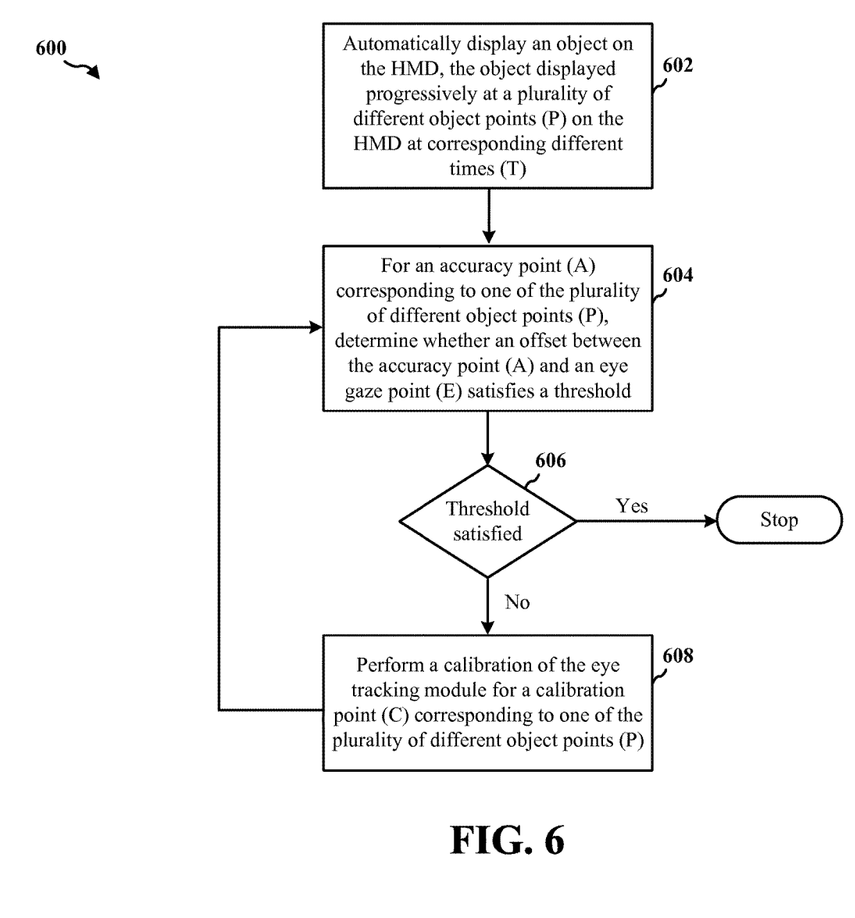
FIG. 6 is a flow chart of a method of automatic calibration of eye tracking module of an optical see-through head mounted display (HMD) being worn by a user.

FIG. 6 is a flow chart 600 of a method of automatic calibration of eye tracking module of an optical see-through HMD being worn by a user. The method may be performed by an AR device. In step 602 the AR device automatically displays an object on the HMD. The object is displayed automatically in the sense that such display is initiated independent of user input.

The object is displayed progressively at a plurality of different object points (P) on the HMD at corresponding different times (T). Progressively, in this context means that an object is displayed in a manner so as to present to the wearer of the AR device a primary point of focus. For example, in one implementation, only one object is displayed on the scene at a time so as to avoid distracting the user with multiple points of focus. The object is displayed at a location for a brief period of time, then reappears after another brief period of time at a different location. Depending on the periods of time, the object may appear to be progressing, or moving across the HMD.

Figure 7:
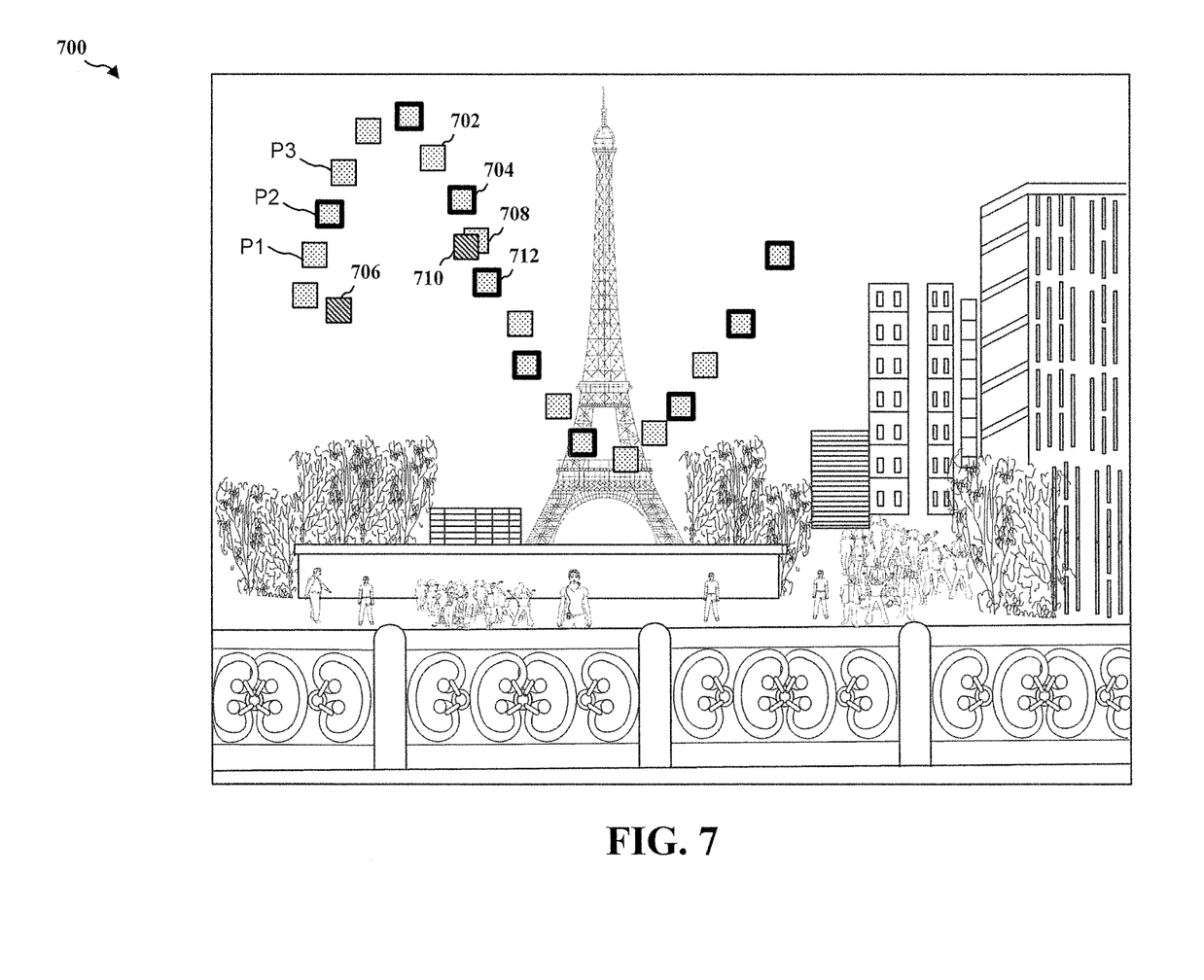
FIG. 7 is an illustration of an HMD screen showing a progressive display of objects for use in eye tracking calibration.

FIG. 7 is an illustration of an HMD screen showing a display of objects for use in eye tracking calibration. While a series of objects points (P) are illustrated for ease in visualization of progressive movement of an object across an HMD screen, in an actual implementation, only one object is displayed at a time. The objects may correspond to one of an accuracy point (A) 702 or a calibration point (C) 704. Also illustrated are eye gaze points (E), which correspond to points output by the eye tracking module.

Returning to FIG. 6, at step 604, for an accuracy point (A) 702 corresponding to one of the plurality of different object points (P), the AR device determines whether an offset between the accuracy point (A) and an eye gaze point (E) 706 satisfies a threshold. The eye-gaze point (E) 706 corresponds to a point on the HMD where the user is determined to be gazing by the eye tracking module. Although shown in FIG. 7 for purposes of explanation, the eye gaze point 706 may not be displayed on the HMD.

The AR device may determine the offset based coordinates of the accuracy point (A) 702 and the eye gaze point (E) 706. For example, the HMD may be characterized by a screen coordinate system. Such as a Cartesian coordinate system having an origin at the center of the HMD. The accuracy point (A) 702 may be characterized by coordinates that represent a location of the object within the screen coordinate system. Likewise, the eye gaze point (E) 706 may be characterized by coordinates that represent a location of the eye gaze within the screen coordinate system. In this case, the AR device derives the offset, e.g., the distance between the points, from the coordinates of the accuracy point (A) and the eye gaze point (E).

At step 606, the AR device determines if the threshold is satisfied. The threshold may be satisfied when the offset between the accuracy point (A) 702 and the eye-gaze point (E) 706 is less than a predetermined value. In one implementation, the predetermined values range from 0 to 10 pixels.

If the AR device determines that the threshold is satisfied, the process stops. If the threshold is not satisfied, then at step 608, the AR device performs a calibration of the eye tracking module for a calibration point (C) 704 corresponding to one of the plurality of different object points (P). The calibration point (C) 704 and accuracy point (A) 702 may be different object points (P).

In an example calibration, the AR device obtains coordinates of the calibration point (C) that represent a location of the object within the screen coordinate system of the HMD, and coordinates of the eye gaze point (E) that also represent a location of the eye gaze within the screen coordinate system. The AR device then determines an offset between the calibration point (C) and the eye gaze point (E) based on the respective coordinates, and calibrates the eye tracking module by adjusting the coordinates of subsequent eye gaze points (E) output by the eye tracking module based on the offset. For example, if the offset between the calibration point (C) and the eye gaze point (E) along the x coordinate of the HMD display is 10 pixels, then the eye tracking module adjusts the x coordinate output of subsequent eye gaze points (E) by 10 pixels.

After calibration, the process returns to step 604, where the AR device determines whether an offset between a subsequent accuracy point (A) 708 and a subsequent eye gaze point (E) 710 satisfies a threshold. The subsequent accuracy point (A) 708 corresponds to one of the plurality of different object points (P). If the threshold is not satisfied at step 606, then the calibration of step 608 is performed at a calibration point (C) 712 corresponding to one of the plurality of different object points (P). The 604. 606 and 608 may be repeated until the threshold is satisfied.

Figure 8:
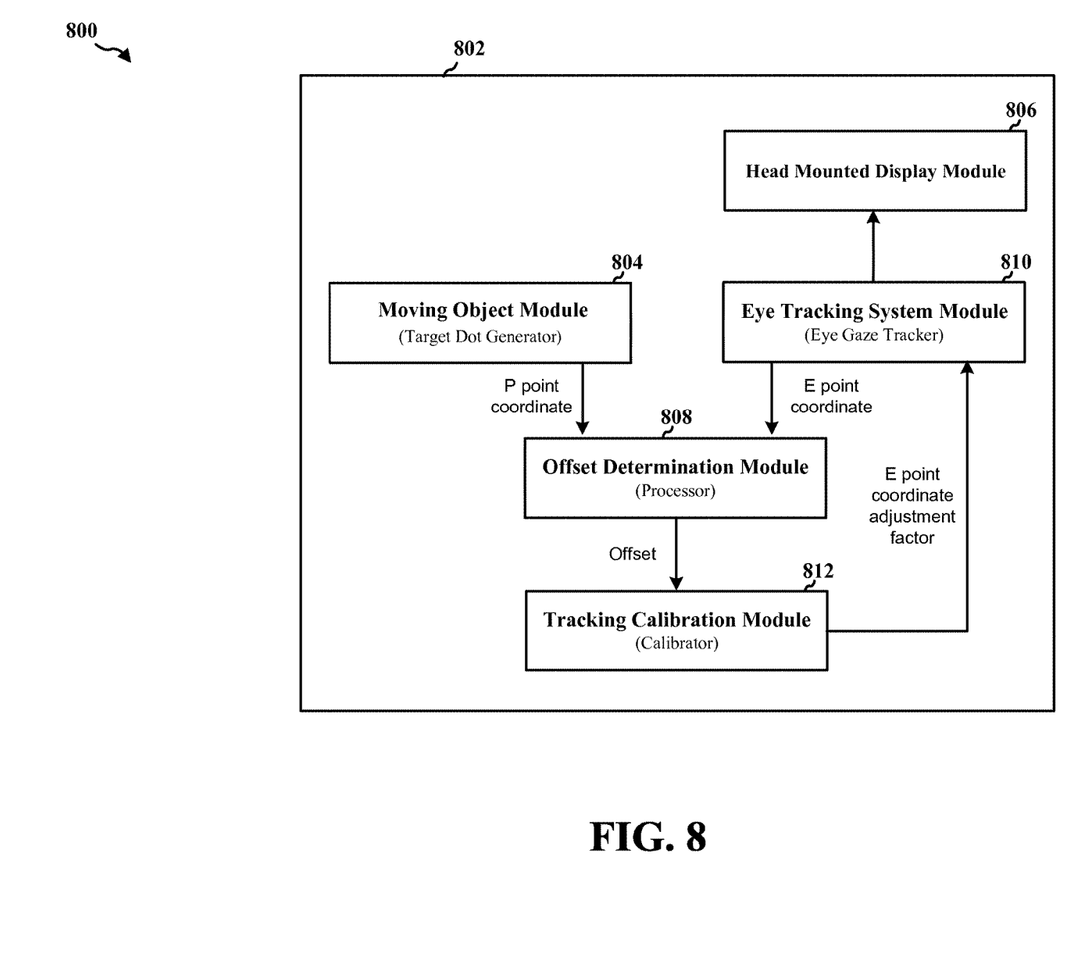
FIG. 8 is a diagram illustrating elements of an AR device that provide automatic eye tracking calibration.

FIG. 8 is a diagram 800 illustrating elements of an AR device 802 that provide automatic eye tracking calibration. The AR device 802 includes a moving object module 804, a head mounted display module 806, an offset determination module 808, an eye tracking system module 810 and a tracking calibration module 812. These modules may be referred to by different names, as indicated parenthetically, and may correspond to one or more of the modules of FIG. 3. For example, the moving object module 804 and the offset determination module 808 may be part of the object selection module 316, the eye tracking system module 810 may be the eye tracking module 312 and the tracking calibration module 812 may be the tracking calibration module 318

The moving object module 804 displays a moving object in a scene visible through a head mounted display module 806. The moving object module is configured to display the object progressively at a plurality of different points (P) at corresponding different times (T). The offset determination module 806 determines, at a first point of the plurality of different points in time, whether an offset between the point P and an eye gaze point (E) satisfies a threshold. The eye-gaze point (E) corresponds to a point where a user is determined to be gazing by the eye tracking system module 810. The tracking calibration module 812 performs a calibration of the eye tracking system at a second point of the plurality of different points in time if the threshold is not satisfied. The offset determination module 808 determines, at a third point of the plurality of different points in time, whether an offset between the point P and an eye gaze point (E) satisfies a threshold.

The AR devices, as illustrated in FIGS. 3 and 8 may include additional modules that perform each of the steps of the algorithm in the aforementioned flow chart of FIG. 6. As such, each step in the aforementioned flow charts of FIG. 6 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
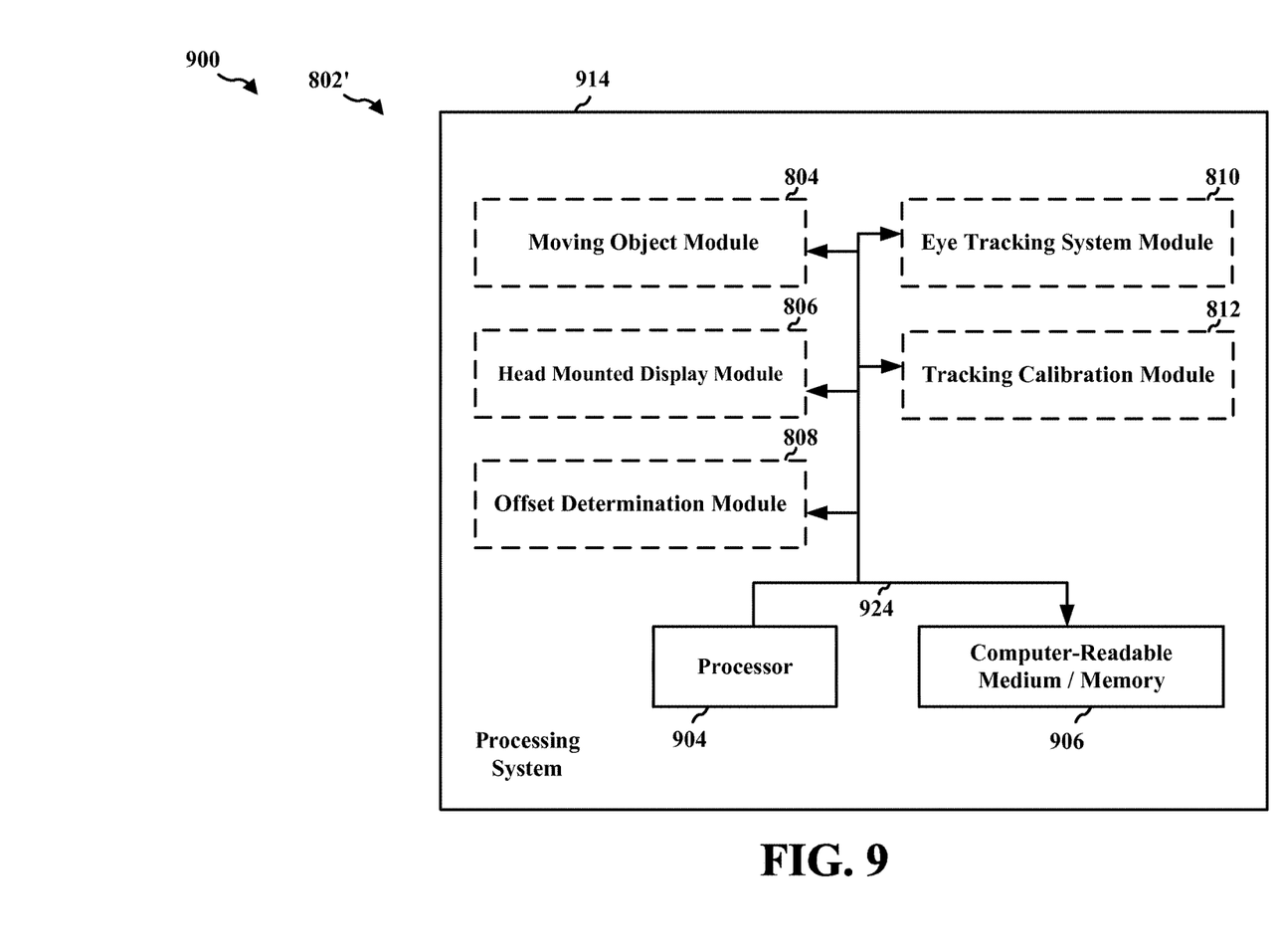
FIG. 9 a diagram illustrating an example of a hardware implementation for an AR device employing a processing system.

FIG. 9 is a diagram 900 illustrating an example of a hardware implementation for an apparatus 802' employing a processing system 914 that includes. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 804, 806, 808, 810, 812 and the computer-readable medium/memory 906. The bus 924 may also link various other circuits such as timing sources, peripherals, voltage regulators, and power management circuits, which are well known in the art, and therefore, will not be described any further.

The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system further includes at least one of the modules 804, 806, 808 and 810. The modules may be software modules running in the processor 904, resident/stored in the computer readable medium/memory 906, one or more hardware modules coupled to the processor 904, or some combination thereof.

In one configuration, the apparatus 802/802' includes means for automatically displaying a moving object in a scene visible through the head mounted display, where the object is displayed progressively at a plurality of different points (P) at corresponding different times (T). The apparatus 802/802' also includes means for, at a first point of the plurality of different points in time, determining whether an offset between the point P and an eye gaze point (E) satisfies a threshold, wherein the eye-gaze point (E) corresponds to a point where a user is determined to be gazing by the eye tracking system. The apparatus 802/802' further includes means for performing a calibration of the eye tracking system at a second point of the plurality of different points in time, if the threshold is not satisfied, and means for repeating the determining step at a third point of the plurality of different points in time. The aforementioned means may be one or more of the aforementioned modules of the apparatus 802 and/or the processing system 914 of the apparatus 802' configured to perform the functions recited by the aforementioned means.

Returning to FIG. 8, in summary, the eye gaze tracker 804, the target dot generator 806, and the processor 810 function together to determine whether an eye tracking system would benefit from calibration. To this end, the target dot generator 806 displays a moving object, such as a dot, in a scene visible through the optical see-through HMD. The object is displayed progressively at a plurality of different points (P) at corresponding different times (T), such as illustrated in FIG. 7.

The eye gaze tracker 804 monitors the eye gaze of the user while the user is gazing at a first point P1 of the plurality of different points in time. For example, with reference to FIG. 7, the user may be gazing at first point P1. The eye gaze tracker 804 determines the coordinates of an eye-gaze point (E) where the user is gazing using a known eye tracking technology.

This eye gaze point (E) may or may not be displayed in the scene. In either case, the processor 808 then determines whether an offset between the point P1 and the eye gaze point (E) satisfies a threshold. If the threshold is not satisfied, the calibrator 810 performs a calibration of the eye tracking system. The calibration is performed at a second point P2 of the plurality of different points in time. For example, with reference to FIG. 7, calibration may be performed at second point P2.

After calibration, the system performs an accuracy check at a third point P3 of the plurality of different points in time. To this end, the eye gaze tracker 804 monitors the eye gaze of the user while the user is gazing at a first point P3. The eye tracker 804 determines an eye-gaze point (E) where the user is gazing. The processor 808 then determines whether an offset between the point P3 and the eye gaze point (E) satisfies the threshold. The foregoing accuracy check and calibration are repeated at successive points until the threshold is satisfied.

In the eye tracking calibration process disclosed herein, a user is presented with a dynamically moving dot and asked to follow it. For example, at time $t_n$, the virtual dot is presented in $P_n$ position, at time $t_{n+1}$, the virtual dot is presented in $P_{n+1}$ position and so on. At time $t_n$, the eye tracking system reports users gaze point $E_n$. The system automatically initiates calibration at time $t_n$ with the dot in $P_n$ position and eye tracking model reported dot $E_n$ position and it measures the calibration offset f at time $t_{n+1}$ with $P_{n+1}$ and $E_{n+1}$. The offset is defined $$f=\text{abs}(\text{dist}(P_{n+1},E_{n+1}))$$

If the offset is less than predefined threshold, calibration is done; otherwise, it initiates calibration in the next point $P_{n+1+k}$ with eye tracking reported point $E_{n+1+k}$ and repeat the same method.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of calibrating an eye tracking module of a device, the method comprising:
    displaying an object at a first object point at a first time, at a second object point at a second time, and at a third object point at a third time on a display of the device, wherein the first, second, and third times are different, wherein the first object point is characterized by first coordinates that represent a first location of the object within a screen coordinate system of the display, the second object point is characterized by second coordinates that represent a second location of the object within the screen coordinate system of the display, and wherein the third object point is characterized by third coordinates that represent a third location of the object within the screen coordinate system of the display;
    determining whether an offset between the first object point and a first eye gaze point satisfies a threshold;
    determining, when the threshold is unsatisfied by the offset between the first object point and the first eye gaze point, a calibration offset between the second object point and a second eye gaze point;
    determining whether an offset between the third object point and a third eye gaze point adjusted based on the calibration offset satisfies the threshold; and
    stopping, when the threshold is satisfied by the offset between the third object point and the third eye gaze point adjusted based on the calibration offset, the calibrating of the eye tracking module.

2. The method of claim 1, wherein displaying comprises displaying the object independent of user input.

3. The method of claim 1, wherein the threshold is satisfied when the offset between the third object point and the third eye-gaze point adjusted based on the calibration offset is less than a predetermined value.

4. The method of claim 3, wherein:
    the third eye gaze point is characterized by coordinates that represent a location within the screen coordinate system; and the offset between the third object point and a third eye gaze point adjusted based on the calibration offset satisfies the threshold is derived from the third coordinates of the third object point and the coordinates of the third eye gaze point adjusted based on the calibration offset.

5. The method of claim 1, wherein determining the calibration offset comprises:
obtaining coordinates of the second eye gaze point that represent a location within the screen coordinate system; and
determining a distance between the second coordinates of the second object point and the coordinates of the second eye gaze point.

6. An apparatus comprising:
means for displaying an object at a first object point at a first time, at a second object point at a second time, and at a third object point at a third time on a display, wherein the first, second, and third times are different, wherein the first object point is characterized by first coordinates that represent a first location of the object within a screen coordinate system of the display, the second object point is characterized by second coordinates that represent a second location of the object within the screen coordinate system of the display, and wherein the third object point is characterized by third coordinates that represent a third location of the object within the screen coordinate system of the display;
means for determining whether an offset between the first object point and a first eye gaze point satisfies a threshold;
means for determining, when the threshold is unsatisfied by the offset between the first object point and the first eye gaze point, a calibration offset between the second object point and a second eye gaze point;
means for determining whether an offset between the third object point and a third eye gaze point adjusted based on the calibration offset satisfies the threshold; and
means for stopping, when the threshold is satisfied by the offset between the third object point and the third eye gaze point adjusted based on the calibration offset, eye tracking calibration.

7. The apparatus of claim 6, wherein the means for displaying is configured to display the object independent of user input.

8. The apparatus of claim 6, wherein the threshold is satisfied when the offset between the third object point and the third eye-gaze point adjusted based on the calibration offset is less than a predetermined value.

9. The apparatus of claim 8, wherein:
the third eye gaze point is characterized by coordinates that represent a location within the screen coordinate system; and
the offset between the third object point and a third eye gaze point adjusted based on the calibration offset satisfies the threshold is derived from the third coordinates of the third object point and the coordinates of the third eye gaze point adjusted based on the calibration offset.

10. The apparatus of claim 6, wherein the means for determining the calibration offset is configured to:
obtain coordinates of the second eye gaze point that represent a location within the screen coordinate system; and
determine a distance between the third coordinates of the third object point and the coordinates of the second eye gaze point.

11. An apparatus comprising:
a memory;
a display; and
at least one processor coupled to the memory, wherein the at least one processor is configured to:
cause an object to be displayed on the display at a first object point at a first time, at a second object point at a second time, and at a third object point at a third time, wherein the first, second, and third times are different, wherein the first object point is characterized by first coordinates that represent a first location of the object within a screen coordinate system of the display, the second object point is characterized by second coordinates that represent a second location of the object within the screen coordinate system of the display, and wherein the third object point is characterized by third coordinates that represent a third location of the object within the screen coordinate system of the display;
determine whether an offset between the first object point and a first eye gaze point satisfies a threshold;
determine, when the threshold is unsatisfied by the offset between the first object point and the first eye gaze point, a calibration offset between the second object point and a second eye gaze point;
determine whether an offset between the third object point and a third eye gaze point adjusted based on the calibration offset satisfies the threshold; and
stop, when the threshold is satisfied by the offset between the third object point and the third eye gaze point adjusted based on the calibration offset, eye tracking calibration.

12. The apparatus of claim 11, wherein to cause the object to be displayed, the at least one processor is configured to cause the object to be displayed independent of user input.

13. The apparatus of claim 11, wherein the threshold is satisfied when the offset between the third object point and the third eye-gaze point adjusted based on the calibration offset is less than a predetermined value.

14. The apparatus of claim 13, wherein:
the third eye gaze point is characterized by coordinates that represent a location within the screen coordinate system; and
the offset between the third object point and a third eye gaze point adjusted based on the calibration offset satisfies the threshold is derived from the third coordinates of the third object point and the coordinates of the third eye gaze point adjusted based on the calibration offset.

15. The apparatus of claim 11, wherein to determine the calibration offset, the at least one processor is configured to:
obtain coordinates of the second eye gaze point that represent a location within the screen coordinate system; and
determine a distance between the third coordinates of the third object point and the coordinates of the second eye gaze point.

16. A non-transitory computer-readable medium having code stored thereon that, when executed, causes at least one processor to:
cause an object to be displayed on a display at a first object point at a first time, at a second object point at a second time, and at a third object point at a third time, wherein the first, second, and third times are different, wherein the first object point is characterized by first coordinates that represent a first location of the object within a screen coordinate system of the display, the second object point is characterized by second coordinates that represent a second location of the object within the screen coordinate system of the display, and wherein the third object point is characterized by third coordinates that represent a third location of the object within the screen coordinate system of the display;

determine whether an offset between the first object point and a first eye gaze point satisfies a threshold;

determine, when the threshold is unsatisfied by the offset between the first object point and the first eye gaze point, a calibration offset between the second object point and a second eye gaze point;

determine whether an offset between the third object point and a third eye gaze point adjusted based on the calibration offset satisfies the threshold; and stop, when the threshold is satisfied by the offset between the third object point and the third eye gaze point adjusted based on the calibration offset, eye tracking calibration.

17. The method of claim 1, wherein the first time is associated with a first period of time, the second time is associated with a second period of time, the third time is associated with third period of time, and wherein the first period of time, the second period of time, and the third period of time do not overlap.

18. The method of claim 1, wherein the device is a head mounted device.

19. The method of claim 18, wherein the device with the display is a head mounted display (HMD).

20. The apparatus of claim 6, wherein the first time is associated with a first period of time, the second time is associated with a second period of time, the third time is associated with third period of time, and wherein the first period of time, the second period of time, and the third period of time do not overlap.

21. The apparatus of claim 6, wherein the apparatus is a head mounted apparatus.

22. The apparatus of claim 21, wherein the apparatus with the display is a head mounted display (HMD).

23. The apparatus of claim 11, wherein the first time is associated with a first period of time, the second time is associated with a second period of time, the third time is associated with third period of time, and wherein the first period of time, the second period of time, and the third period of time do not overlap.

24. The apparatus of claim 11, wherein the apparatus is a head mounted apparatus.

25. The apparatus of claim 24, wherein the apparatus with the display is a head mounted display (HMD).

* * * * *